(12) United States Patent
Klein et al.

(10) Patent No.: US 7,558,794 B2
(45) Date of Patent: Jul. 7, 2009

(54) DATABASE SYSTEM AND METHOD WITH ASSIGNED LOCKS

(75) Inventors: Udo Klein, Maximilliansau (DE); Paul Volker, Rülzheim (DE)

(73) Assignee: SAP AG, Walldorf (DE)

( * ) Notice: Subject to any disclaimer, the term of this patent is extended or adjusted under 35 U.S.C. 154(b) by 526 days.

(21) Appl. No.: 10/808,671

(22) Filed: Mar. 24, 2004

(65) Prior Publication Data

US 2005/0216463 A1 Sep. 29, 2005

(51) Int. Cl.
G06F 7/00 (2006.01)
(52) U.S. Cl. .............................................. 707/9; 707/3
(58) Field of Classification Search .................. 707/2, 707/8–9, 201, 203, 100–102, 103 R; 709/224
See application file for complete search history.

(56) References Cited

U.S. PATENT DOCUMENTS

| | | | | |
|---|---|---|---|---|
| 5,832,484 A | * | 11/1998 | Sankaran et al. | 707/8 |
| 6,347,486 B1 | * | 2/2002 | Badillet | 49/394 |
| 6,438,562 B1 | * | 8/2002 | Gupta et al. | 707/201 |
| 6,456,900 B1 | * | 9/2002 | Kakuta | 700/233 |
| 6,879,243 B1 | * | 4/2005 | Booth et al. | 340/5.73 |
| 6,901,401 B2 | * | 5/2005 | Bangel et al. | 707/9 |
| 2003/0187848 A1 | * | 10/2003 | Ghukasyan et al. | 707/9 |

* cited by examiner

*Primary Examiner*—Sathyanarayan Pannala
(74) *Attorney, Agent, or Firm*—Finnegan, Henderson, Farabow, Garrett & Dunner, L.L.P.

(57) ABSTRACT

A method for handling database locks includes detecting a new query from an administrator for a set of database records. Next, it is determined whether the administrator has any chance of being authorized to acquire a new lock. If so, an attempt is made to acquire the new lock and, on the failure to acquire, the administrator is informed that the lock has already been acquired by a prior administrator. Optionally, the new administrator is also provided with identifying information of the prior administrator and contact information for the prior administrator. The new administrator is therefore pre-screened to determine whether there is any chance to acquire a new lock to reduce the chance that an unauthorized new administrator could lock the set of database records. Also, should the new administrator be authorized but not able to access the set of database records due to a prior lock, the new administrator can be informed of the identity and contact information concerning the holder of the prior lock.

28 Claims, 7 Drawing Sheets

DATABASE SYSTEM AND METHOD WITH ASSIGNED LOCKS

TECHNICAL FIELD

This invention relates generally to database management systems, and more particularly to the handling of locks for database records.

BACKGROUND ART

Computerized databases are used to store large amounts of information. This information is often organized in a hierarchical fashion, e.g. into fields, records, sets, etc. Such a hierarchical organization tends to be virtual, rather than physical, based upon the algorithms implemented by the database management systems.

Databases can be of various types, including flat databases and relational databases. Generally speaking, relational databases are preferred when dealing with large numbers of records which need to be accessed in a variety of ways. For example, many business organizations use a relational database to handle their human resource ("HR") function.

Databases are usually administered by one or more database administrators. In small organizations, such in a small business, there may be only one administrator for the database. This has the advantage of simplicity, in that it reduces potential conflicts. However, in large companies it is impractical to have a single administrator to handle an entire database function, e.g. the HR database function and, therefore, conflicts between multiple administrators occur and must be handled.

One way to handle the potential conflict of having multiple administrators trying to access and perhaps change the same data can be handled with the provision of database locks. That is, if a first administrator (referred to herein as a "prior administrator") accesses a particular set of records, a "lock" on those records can be implemented such that a second administrator (referred to herein as a "new administrator") is prevented from at least changing that those records. In many instances, the new administrator may be prevented from even viewing the locked files.

This method of locking portions of a database has the advantage of preventing the inherent conflicts and potential instability of the database when two or more administrators access the same data at the same time. For example, if both administrators were attempting to update the same field within a record, the system could be destabilized and data could be lost or corrupted.

A problem that happens from time to time in large organizations is that a prior administrator unnecessarily locks out a new administrator. For example, with systems in the prior art, when a prior administrator first accesses or "queries" the records, a lock is immediately put in place. However, it could be that the prior administrator does not even have privileges sufficient to allow access to those records. In consequence, neither the prior administrator nor the new administrator can access that information. In fact, until the prior administrator has released the lock, no new administrator can be provided with access to those files. This can be very troublesome in large organizations where there may be hundreds of administrators located in multiple countries around the world. That is, it maybe hard to identify the administrator who is locking up the records and, in fact, the records may become inaccessible for an extended period of time.

This problem has no easy solution, and has been long-felt in the industry. The logical solution would be not provide a lock to any potential administrator if they do not have the authority to view or manipulate those records. However, to fully check all of the privileges for all applicable records might require thousands of database queries. Even with modern, high speed computers such searches would be too time consuming to be practical.

SUMMARY

An aspect of the present invention includes a quick, preliminary screening method to prevent an administrator from creating a lock without proper authority. While this preliminary screening will not be entirely conclusive, it can eliminate a very high percentage of instances where its is clear that an administrator has no chance of being authorized to access that set of records. In fact, in tests on a sample system, the preliminary screening can identify about 95% of the instances when an administrator has no chance of being authorized to access a set of records. The small percentage of time (5% in this example) when the administrator is not screened out by the preliminary screening and it turns out that the administrator was, indeed, not authorized, the system is no worse off than it had been prior to implementing the pre-screening methodologies of embodiments of the present invention.

Briefly, a method for handling database locks in accordance with an embodiment of the present invention includes detecting a new query from a new administrator for a set of database records capable with being associated with a new lock. When the new query is detected, it is determined with a preliminary screening whether the new administrator has any chance of being authorized to acquire the new lock. If it is determined that the new administrator does have a chance of acquiring a lock, the system attempts to acquire the new lock. If, however, the new administrator fails to acquire the new lock, the new administrator is informed to that fact. Optionally, the new administrator can be provided with information identifying the prior administrator that holds a prior lock. Also optionally, the new administrator can be provided with contact information for the prior administrator, such that the prior administrator can be contacted to determined if the prior lock is still required.

In another aspect of the present invention, a computer readable media including program code segments for handling database locks includes a code segment for detecting a new query from a new administrator, a code segment determining whether the new administrator has any chance of being authorized to acquire the lock, a code segment attempting to acquire the new lock if the new administrator has a chance of being authorized, and a code segment informing the new administrator of a failure to acquire the new lock. Optionally, the code segment informing the new administrator can identify the prior administrator. Further optionally, the code segments for informing the new administrator can include contact information for the prior administrator.

In another aspect of the present invention, a method for making a preliminary determination as to whether a database administrator has authorization to access a set of database records includes determining whether a database administrator has no chance of being so-authorized. In particular, a method in accordance with an embodiment of the present invention determines that a database administrator has no chance of being authorized to access a designated set of database records if the database administrator does not have one or more of (a) write authorization; (b) a lack of conflict of interest; (c) organizational permission; or (d) current authorization. The method of the disclosed embodiment also includes determining that a database administrator has a chance of being authorized if the database administrator has one or more of: (a) write authorization and maximum administrator authorization; and (b) write authorization, no conflict of interest, organizational permission, and current authorization.

Another aspect of the present invention includes a computer readable media including program code segments for implementing the aforementioned method for making a preliminary determination as to whether a database administrator has authorization to access a set of database records.

Yet another aspect of the present invention includes a database system including locks including means for detecting a new query from a new administrator for a set of database records presently associated with the new lock, means for determining whether the new administrator has any chance of being authorized to acquire the lock, means for attempting to acquire the new lock if the new administrator has a chance of being authorized, and means for informing the new administrator of a failure to acquire the new lock if a prior lock has already been acquired due to a prior query by a prior administrator. Optionally, the database system can further include means for identifying prior administrators, and means for providing contact information for the prior administrator.

Another embodiment of a database system in accordance with the present invention includes a number of administrative terminals, and a database server capable of being accessed by those administrative terminals. The database server includes at least in part, a database program capable of managing a number of records. The database program preferably includes the functionality of: (a) detecting a new query from a new administrator at a new administrator terminal for a set of database records that is associated with the new lock; (b) determining whether the new administrator has any chance of being authorized to acquire the new lock; (c) attempting to acquire the new lock if the new administrator has a chance of being authorized; and (d) informing the new administrator at the new administrator terminal of a failure to acquire the new lock if a prior lock has already been acquired due to a prior query by a prior administrator on a prior administrator station. Optionally, informing the new administrator includes identifying, on a new administrator station, the prior administrator. Also optionally, informing the new administrator includes, on the new administrator station, providing contact information for the prior administrator.

An advantage of the various embodiments and aspects of the present invention is that there is a quick, efficient, preliminary screening of administrators to prevent them from acquiring locks when there is no chance that they will authorized for those files. By providing a quick, preliminary screening, the majority of instances when an administrator does not have authority to access the files will be detected. In those instances, where the preliminary screening still allows an unauthorized administrator to obtain a lock, the system is no worse off than it had been previously.

Another advantage of embodiments of the present invention is that the administrator who has locked a set of files will be identified to a new administrator attempting to access those files. This identification can include an identification of the administrator holding the lock and, in some cases, contact information. Therefore, a qualified, pre-screened and authorized new administrator can contact the prior administrator to request that the lock be removed.

These and another advantages of the present invention will no doubt will become apparent to those of skill in the art upon reading of the following descriptions and a study of the several figures of the drawings.

BRIEF DESCRIPTION OF THE DRAWINGS

FIG. 2b is a screen shot of an attempt of a new administrator to access the same set of files as the prior administrator of FIG. 2a.

DETAILED DESCRIPTION

Figure 1:
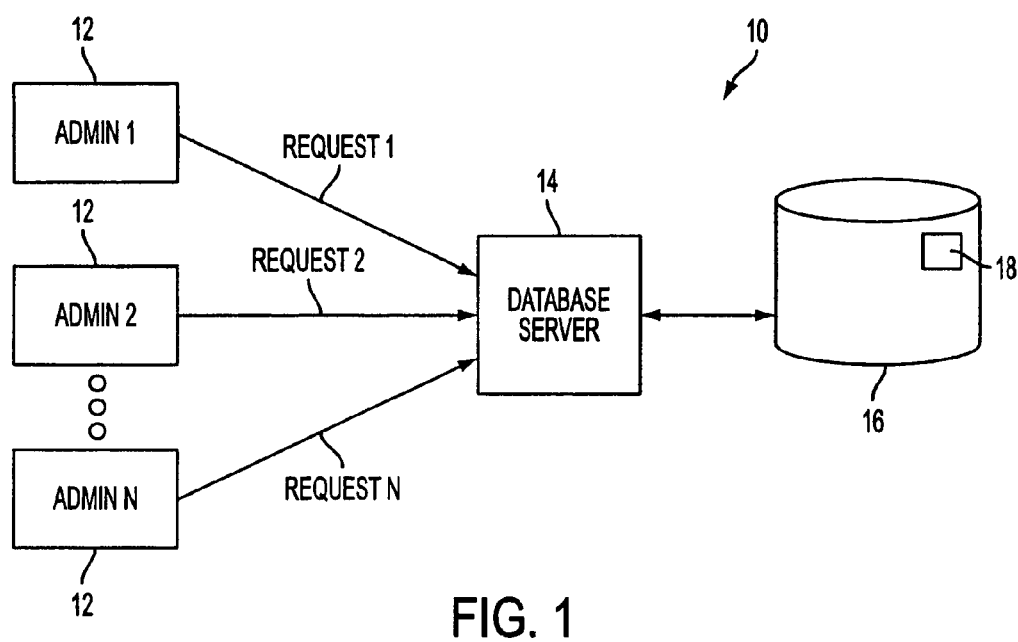
FIG. 1 is a block diagram of a database management system with locks in accordance with embodiments of the present invention.

In FIG. 1, a database system 10 including locks includes a number of administrator terminals 12 coupled to a database server 14 which administers a database 16. Typically the database is stored in a computer readable medium such as, for example, a hard disk drive, semiconductor memory, a tape drive, or an optical disk drive.

It should be noted that the database system 10 is illustrated in a functional, rather than physical, form in that the functionality of administrative terminals 12, database server 14, and database 16 can be implemented on one or more physical devices. Typically, however, each of the administrative terminals 12 comprises a personal computer or computer work station available for use by a human administrator. Likewise, the database server 14 can be implemented in one or more physical servers or computer systems, typically dependent upon the scale of the database system. For example, if the database system 10 is designed to support the HR function of a large, international company, the database server 14 may comprise dozens or even hundreds of separate servers located around the world. Likewise, the database 16 can be localized or distributed.

The terminals 12, database 14, and computer readable media 16 can be directly coupled together, or can be linked together for communications via, for example, a network, as be well appreciated by those skilled in the art. Often, the network is a TCP/IP network in the form of one or more of, for example, a local area network, an Intranet or the Internet. In the case of publicly accessible networks such as the Internet, security protocols (e.g. encryption) are typically used to prevent the unauthorized access to confidential information.

Administrators attempt to access files through database "queries", as is well known to those skilled in the art of database management. As noted previously, a problem can occur when a first administrator ("prior administrator") on a first administrator terminal 12 causes a "lock" on a file or set of files. This means a second administrator ("new administrator") and subsequent administrators cannot fully access that set of files 18, or may not be able to access the files at all until the lock is removed.

As used herein, "set of files" shall mean data including at least one file having at least one record. Therefore, a "set of files" can include a single file or even a single record, although typically it includes a number of files, each of which includes a number of records.

Figure 2A:
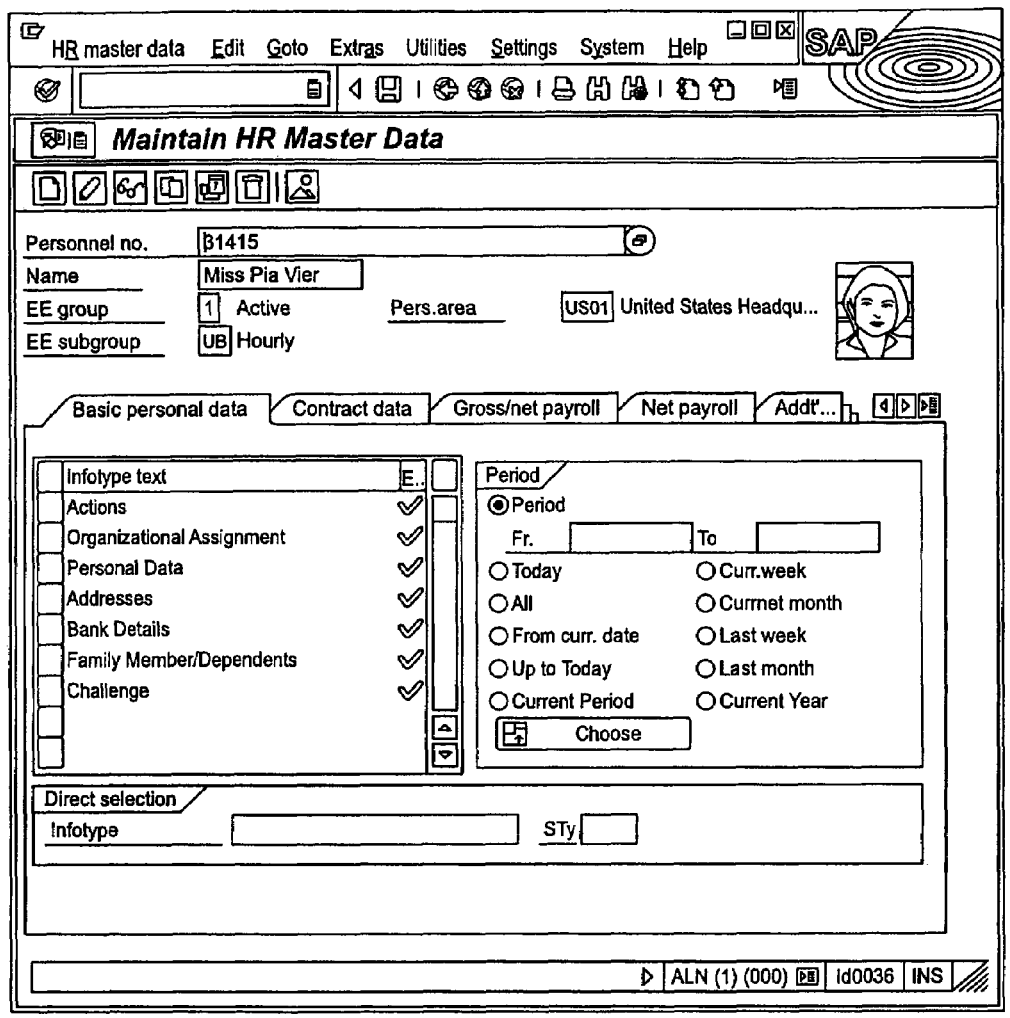
FIG. 2a is a screen shot of a sample set of records accessible in the database system of FIG. 1 as seen by a prior administrator.

In FIG. 2a, a screen shot 20 illustrate a HR master data page for a hypothetical employee by the name of Miss Pia Vier. Miss Vier is assigned personnel number "31415" and has personnel records falling under a variety of "Infotypes" including personal data, addresses, bank details, etc. as shown on the left hand side of her basic personal data folder. Other folders such as "contract data," "gross/net payroll," "net payroll," etc. are shown hidden behind the basic personal data in this view. On the right hand side of the screen shot 20, a number of search parameter fields are provided such that the administrator can search through the various records for this employee.

Figure 2B:
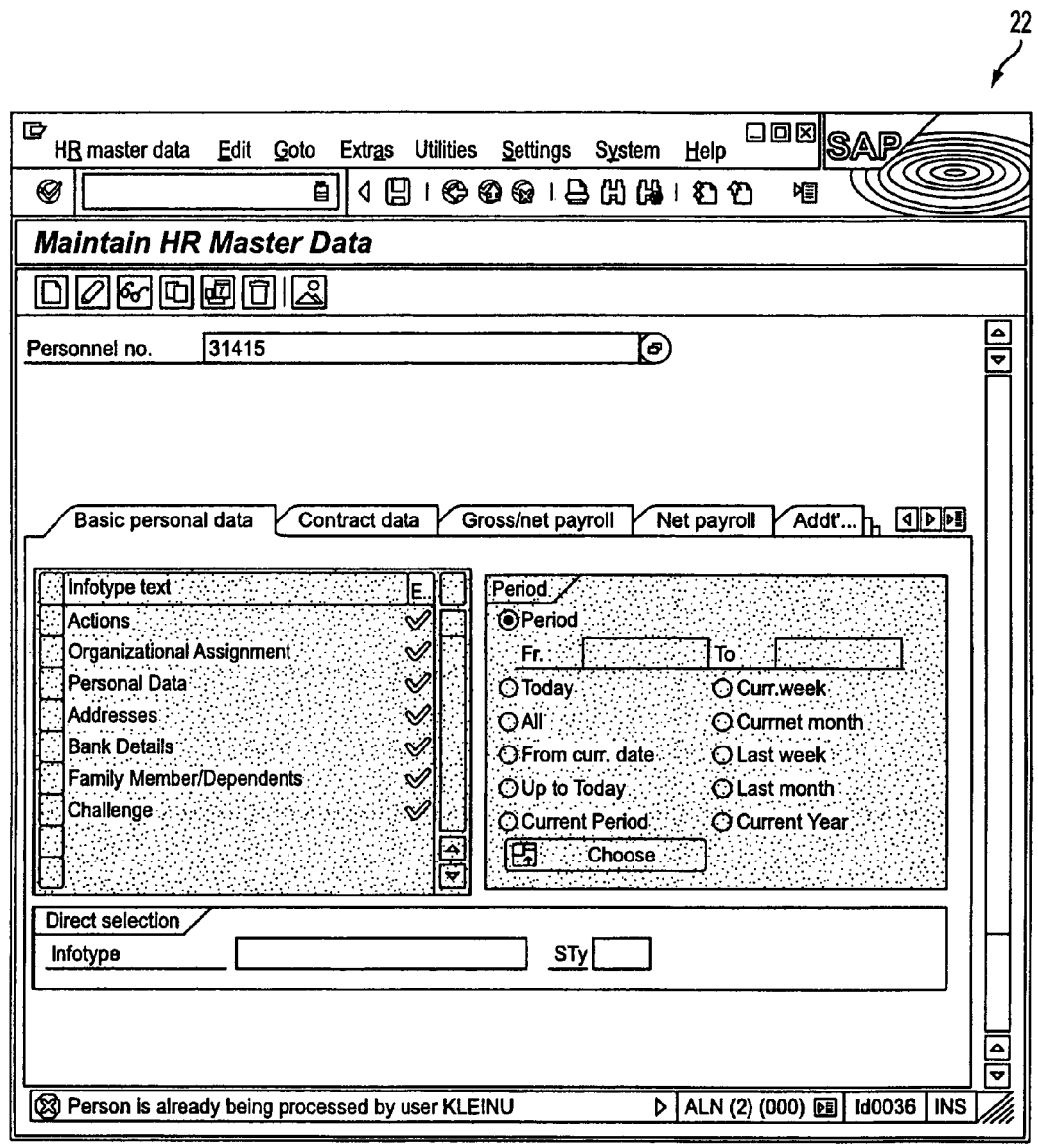

In FIG. 2b, a screen shot 22 illustrates the screen that is seen on a new administrator's terminal for a new query. In this instance, it can be seen that most of the identification information concerning employee 31415 is not available. This is a first indication that a prior administrator has a lock on this employee's files. Furthermore, in the screen shot 22 an indication of the identity 24 of the prior administrator indicates that "KLEINU" is the holder of the lock. Contact information 26 (in this case KLEINU's telephone extension "x1234") can be provided such that KLEINU can be contacted to determine whether the lock can be removed from these records.

Figure 3:
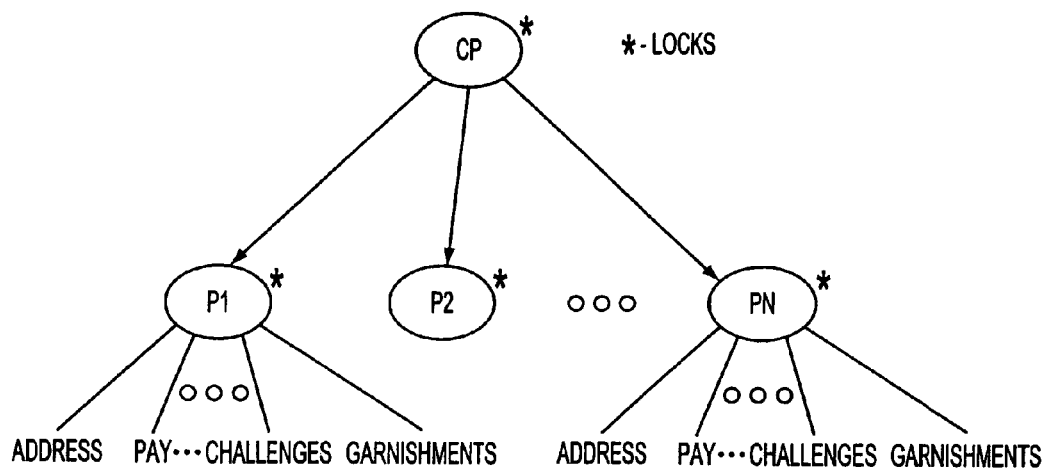
FIG. 3 is a diagram of an exemplary Human Resource (HR) database model.

In FIG. 3, a diagram of a particular example of a database structure consistent with the aforementioned HR database is shown. It should be noted this database structure is presented by way of example only, and not limitation. That is, there are many ways to create records, files, and sets of files with respect to database management systems, as would be appreciated by those skilled in the art. In this diagram, a person (employee) is designated as CP, while various work assignments or "contracts" for the person are designated as P, where the set of P files is designated as {P1, P2, . . . , PN}. This is in recognition of the fact that in large companies an employee CP may have several distinct job functions P, each with their own parameters.

For example, in a multinational company, an employee may have a job as a software developer in his home country, and a software salesman in another country. As another example, an employee may have a half-time job as an administrative assistant during the morning hours, and a half-time job as a graphical designer in the afternoon hours. Therefore, in recognition of the fact that an employee can have multiple work assignments or "contracts" with the company or organization, a hierarchical file structure is set up with the CP files at a root level and a P files branching from the root level. Each of the P files will include various "Infotype" records including, for example, address, pay, challenges, garnishments, etc.

It should be noted that a number of the Infotypes for a P file will be the same regardless of the contract. For example, the address, challenges, garnishments, Infotypes will be the same for each of the P files under a particular CP file because they refer to the same person. However, other Infotypes such as the organizational assignment, pay, etc. maybe different from P file to P file. Therefore, access authority (i.e. privileges) for each CP and P file, and each Infotype, may vary from administrator to administrator.

In the past, the problem sometimes occurred that an administrator attempting to access, for example, Infotype garnishments of a file P1 creates locks on all of the P files and the CP file as well. This is because the system has to assume that the administrator accessing contract P1 could change common Infotypes such as address, challenges, etc. and, therefore, the entire CP file should be locked. However, this created inefficiencies in the past since the administrator making the query might not even have the authority view the garnishments records, for example. That authority would be determined by a set of privileges that depends upon the rank, security clearance, seniority, conflicts, etc. of the particular administrator.

In particular, where there are hundreds of administrators, each of which may have many different preferences, it is very difficult to determine conclusively in advance whether an administrator has the authority to access a particular set of records. An aspect of the present invention addresses a new method for handling database locks which reduces the chance of an inadvertent lock on a set of records.

Figure 4:
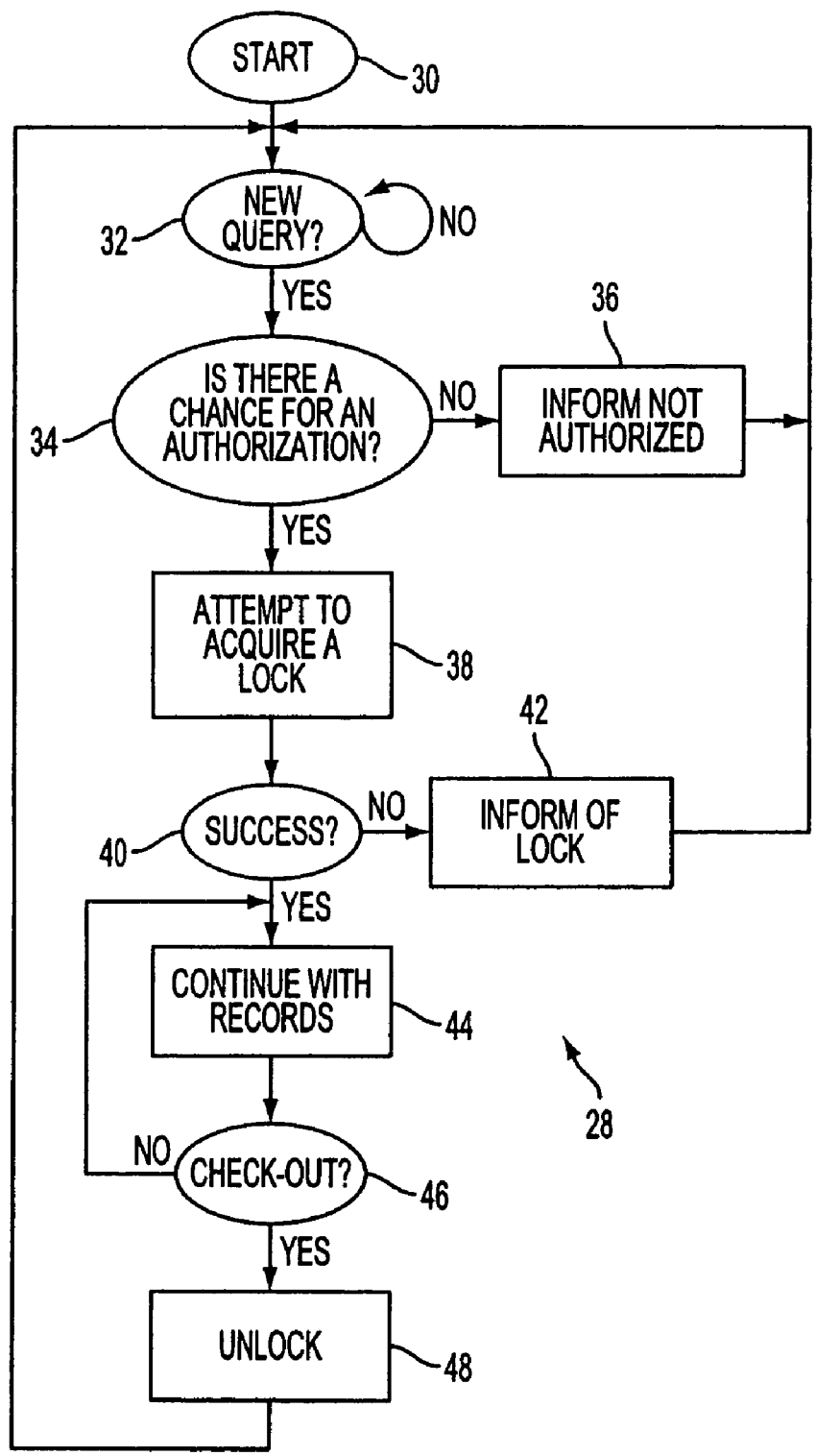
FIG. 4 is a flow diagram of an embodiment of a method for handling database locks in accordance with the present invention.

In FIG. 4, a process 28 illustrates an embodiment of a method for handling database locks in accordance with the present invention. The process 28 begins at 30 and, in an operation 32, is determined if there is a new query. If not, operation 32 continues to loop in a wait loop until a new query is observed. Once a new query has been observed, an operation 34 determines whether there is a chance that there is authorization for the new administrator to access the requested set of files. If not, an operation 36 informs the new administrator and returns process control to operation 32 to await a new query. However, if there is a chance that there is authorization, an operation 38 attempts to acquire a lock on the set files. An operation 40 then determines whether the attempt of operation 38 was successful. If not, an operation 42 informs the new administrator that there is already a lock on the set of files, and an operation control returns to operation 32.

If, on the other hand, the operation 40 determines that the attempted lock acquisition was successful, the new administrator is provided with access to the set of records in an operation 44. Also, since the new administrator has successfully acquired the lock, he or she becomes the prior administrator and the lock becomes a prior lock to any subsequent administrator. The administrator continues to process the records in an operation 44 until the administrator "checks-out" from the record, i.e. finishes with the record and releases the lock. An operation 48 then unlocks the records and operational control returns to operation 32 to await a new query.

Figure 5:
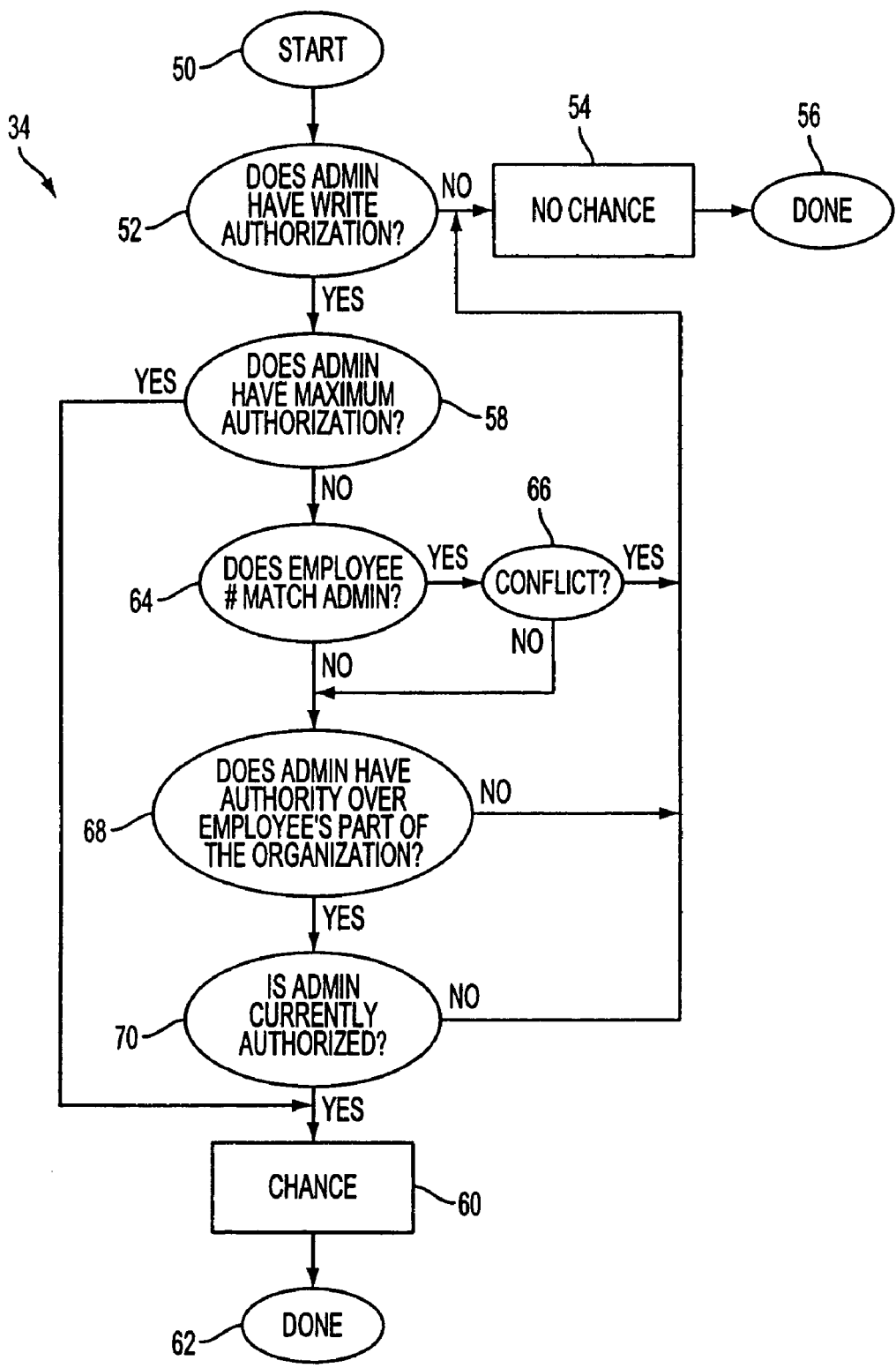
FIG. 5 is a flow diagram of the operation "IS THERE A CHANCE THAT THERE IS AUTHORIZATION?" of FIG. 4.

In FIG. 5, the process 34 ("IS THERE A CHANCE THAT THERE IS AUTHORIZATION?") is illustrated in greater detail. Process 34 begins at 50 and, in an operation 52 it is determined whether the administrator has write authorization. If not, it is determined that administrator has no chance of obtaining a lock on the system in an operation 54 and the process 34 is complete at 56. If the administrator does have write authorization as determined by operation 52, an operation 58 determines whether the administrator has the maximum authorization available for the system. This can, for example, be provided to a master system administrator. If so, it is determined that there is at least chance that this administrator has access in an operation 60 and the process is complete at 62.

Alternatively, if operation 58 determines that the administrator does not have the maximum authorization level, an operation 64 determines whether the employee number matches the administrator. Typically, an administrator is not permitted to change certain of his or her own employment records due to potential conflict of interest. If the employee number does match the administrator, it is then determined an operation 66 if the access is minimal, e.g. to non-critical information such as the administrators' home address. If not, e.g. the administrator is attempting to accessing his or her own pay records, a conflict of interest is detected and process control is returned to operation 54.

If, however, the operation 66 determines that the access to the set of records is minimal in nature, an operation 68 determines whether the administrator is authorized to have access to sets of files relating to personnel in that particular part of the organization. If not, operational control is turned over to operation 54 indicating there is no chance of authorization. However, if the administrator is currently authorized, as determined in an operation 70, operational control is turned over to operation 60 indicating that there is a chance of authorization and, if not, process control is turned over to operation 54 to indicate that there is no chance. In either case, the process 34 would then be complete.

Figure 6:
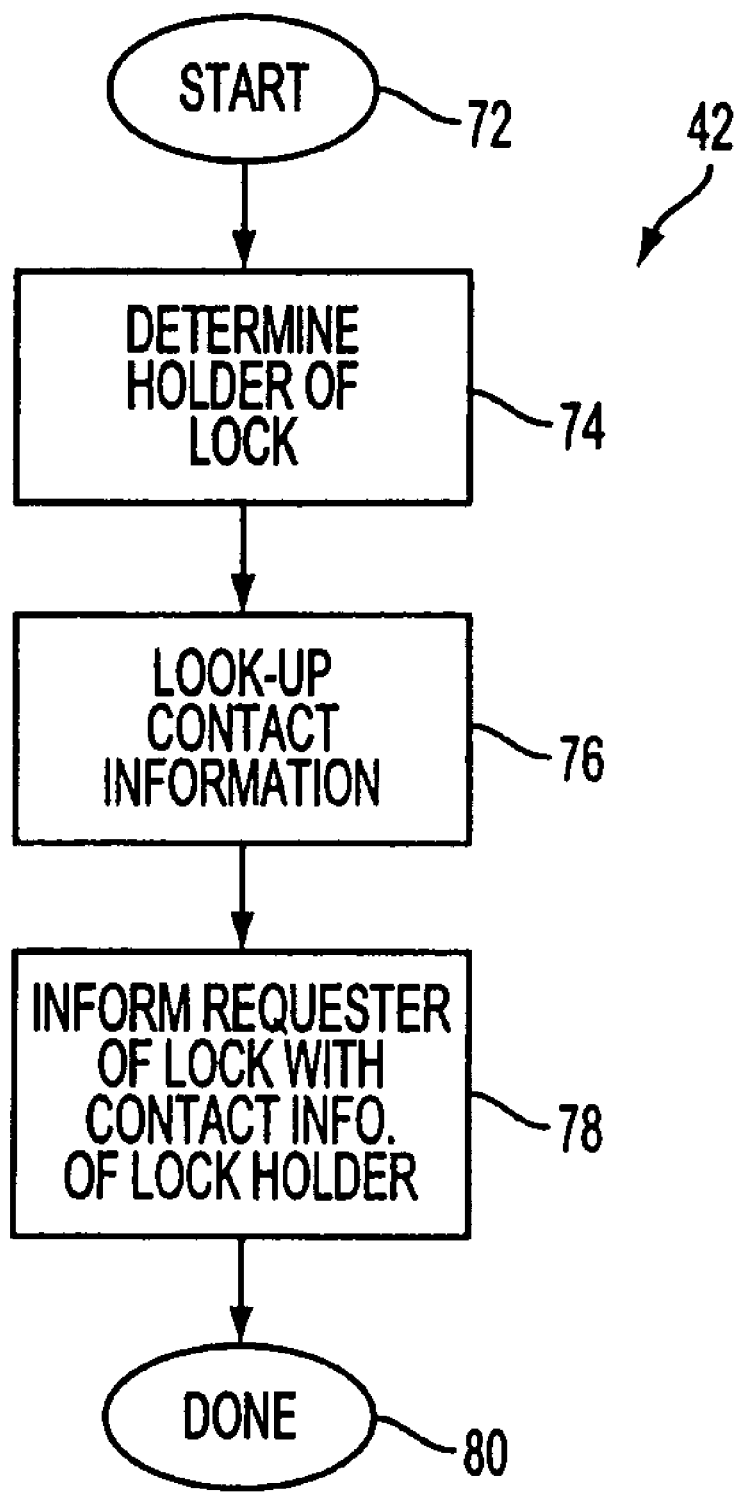
FIG. 6 is a flow diagram of the "INFORM USER OF LOCK" operation of FIG. 4.

In FIG. 6, the operation 42 ("INFORM USER OF LOCK") of FIG. 4 is illustrated in greater detail. Process 42 begins at 72 and, in an operation 74, it is determined who is the holder of the lock, i.e. who is the prior administrator. In an operation 76, contact information can be looked up for the prior lock holder. In an operation 78, the requested can be informed in the lock with contact information of the prior lock holder. The process 42 is then complete at 80.

Referring again to FIG. 2b, it can be seem that informing the new administrator that there is a lock can take several levels. On the simplest level, a new administrator can simply be informed that the records are locked without any indication of who holds that lock. On another level, the holder of the lock can be identified e.g. in this case KLEINU. On a still further level contact information can be provided, such as the extension number x 1234 of the prior administrator KLEINU. Of course, as will be apparent to those skilled in the art, there are other forms of contact information that can be provided to the new administrator, such as the e-mail address, pager number, cell phone number, etc. of the holder of the prior lock.

A primary example in the preceding descriptions has been in the context of a Human Resource database management system. As is no doubt apparent to those of ordinary skill in the art, aspects of the present invention are useful a wide variety of database applications employing locks. It is therefore intended that the preceding examples be considered by way of illustration, and not restriction, and that present invention be interpreted as including all those modifications, permutations, extensions, equivalents, and the like that fall within the true spirit and scope of the present inventions.

What is claimed is:

1. A method for authorizing access to a human resources database implemented on a computer-readable medium, comprising:

acquiring a lock after a first query is submitted by a first user, the first query relating to a first set of database records;

detecting, by a computer, whether a second query for a second set of database records is submitted by a second user, the second set of database records associating with the first set of database records, wherein the second user is associated with a level of an organization;

examining, after detecting the second query for the second set of database records which is submitted by the second user, an employee number associated with the second set of database records submitted in the second query and an employee number associated with the second user to determine if the second user is authorized to access the second set of database records;

denying the second user from accessing the second set of database records if the employee number associating with the second set of database records submitted in the second query matches the employee number associated with the second user;

determining, if the employee number associating with the second set of database records submitted in the second query differs from the employee number associated with the second user, whether the lock is acquired by the first user;

denying the lock to the second user if the lock is acquired by the first user;

granting the lock to the second user if the lock is not acquired by the first user; and informing, after denying to grant the lock to the second user, the second user with information relating to the identification of the first user, in accordance with the level of the second user.

2. The method as recited in claim 1 further comprising permitting access to the second set of database records if the second user is authorized.

3. The method as recited in claim 1 further comprising releasing the lock after the first user has checked out from the first set of database records.

4. The method as recited in claim 1 wherein determining whether the second user is authorized further includes determining whether the second user has write authorization for the set of database records.

5. The method as recited in claim 1 wherein determining whether the second user is authorized further includes determining whether the second user has a maximum database access authorization.

6. The method as recited in claim 1 wherein determining whether the second user is authorized includes determining whether the second user is organizationally authorized.

7. The method as recited in claim 1 wherein determining whether the second user is authorized includes determining includes whether the second user is currently authorized.

8. A computer-readable medium storing program instructions for performing a method of authorizing access to a human resources database, the method comprising:

acquiring a lock after a first query is submitted by a first user, the first query relating to a first set of database records;

detecting, by a computer, whether a second query for a second set of database records which is submitted by a second user, the second set of database records associating with the first set of database records, wherein the second user is associated with a level of an organization;

examining, after detecting the second query for the second set of database records is submitted by the second user, an employee number associated with the second set of database records submitted in the second query and an employee number associated with the second user to determine if the second user is authorized to access the second set of database records;

denying the second user from accessing the second set of database records if the employee number associating with the second set of database records submitted in the second query matches the employee number associated with the second user;

determining, if the employee number associating with the second set of database records submitted in the second query differs from the employee number associated with the second user, whether the lock is acquired by the first user;

denying the new lock to the second user if the lock is acquired by the first user;

granting the lock to the second user if the lock is not acquired by the first user; and informing, after denying to grant the lock to the second user, the second user with information relating to the identification of the first user, in accordance with the level of the second user.

9. The computer-readable medium as recited in claim 8 further comprising permitting access to the second set of database records if the second user is authorized.

10. The computer-readable medium as recited in claim 9 further comprising releasing the lock after the first user has checked out from the first set of database records.

11. The computer-readable medium as recited in claim 8 wherein determining whether the second user is authorized includes determining whether the second user has write authorization for the second set of database records.

12. The computer-readable medium as recited in claim 8 wherein determining whether the second user is authorized includes determining whether the second user has a maximum database access authorization.

13. The computer-readable medium as recited in claim 8 wherein the second user has a conflict of interest when the second set of database records personally pertain to the second user.

14. The computer-readable medium as recited in claim 8 wherein determining whether the second user is authorized includes determining whether the second user is organizationally authorized.

15. The computer-readable medium as recited in claim 8 wherein determining whether the second user is authorized includes determining whether the second user is currently authorized.

16. A database system implemented on a computer-readable medium authorizing access to a human resources database, comprising:
    a processor;
    a memory storing instructions executable by the processor, the instructions comprising:
        means for acquiring a lock after a first query is submitted by a first user, the first query relating to a first set of database records;
        means for detecting, by a computer, whether a second query for a second set of database records is submitted by a second user, the second set of database records associating with the first set of database records, wherein the second user is associated with a level of an organization
        means for examining, after detecting the second query for the second set of database records which is submitted by the second user, an employee number associated with the second set of database records submitted in the second query and an employee number associated with the second user to determine if the second user is authorized to access the second set of database records;
    means for denying the second user from accessing the second set of database records if the employee number associating with the second set of database records submitted in the second query matches the employee number associated with the second user;
    means for determining, if the employee number associating with the second set of database records submitted in the second query differs from the employee number associated with the second user, whether the lock is acquired by the first user;
    means for denying the lock to the second user if the lock is acquired by the first user;
    means for granting the lock to the second user if the lock is not acquired by the first user; and
    means for informing, after denying to grant the lock to the second user, the second user with information relating to the identification of the first user, in accordance with the level of the second user.

17. The database system as recited in claim 16 further comprising means for permitting access to the second set of database records if the second user is authorized.

18. A method for making a preliminary determination of whether a second user has authorization to access a second set of database records implemented on a computer-readable medium, comprising:
    acquiring a lock after a first query is submitted by a first user, the first query relating to a first set of database records;
    detecting, by a computer, whether a second query for the second set of database records is submitted by a second user, the second set of database records associating with the first set of database records, wherein the second user is associated with a level of an organization;
    examining, after detecting the second query for the second set of database records which is submitted by the second user, an employee number associated with the second set of database records submitted in the second query and an employee number associated with the second user to determine if the second user is authorized to access the second set of database records;
    denying the second user from accessing the second set of database records if the employee number associating with the second set of database records submitted in the second query matches the employee number associated with the second user;
    determining, if the employee number associating with the second set of database records submitted in the second query differs from the employee number associated with the second user, whether the lock is acquired by the first user, and whether the user is authorized to access the second set of database records based on at least one of (a) write authorization and (b) a lack of conflict of interest;
    denying the lock to the second user if the lock is acquired by the first user;
    granting the lock to the second user if the lock is not acquired by the first user; and
    informing, after denying to grant the lock to the second user, the second user with information relating to the identification of the first user, in accordance with the level of the second user.

19. The method of claim 18, further comprising:
    setting the lock or making an attempt to set the lock if the second user is authorized.

20. The method of claim 18, wherein determining whether the user is authorized to access the second set of database records further includes determining whether the second user has a maximum database access authorization.

21. The method of claim 18, wherein determining whether the second user has a conflict of interest includes determining whether the second set of database records personally pertain to the second user.

22. The method of claim 18, further comprising:
    determining, when the employee number associated with the set of database records matches the employee number of the second user, whether the second set of database records comprise critical or non-critical information; and
    wherein the second user is not authorized when the second set of database records comprise critical information.

23. The method of claim 22, wherein the critical information comprises pay records of the second user.

24. A method for determining whether a user has authorization to access a set of database records, comprising:
  acquiring a lock after a first query is submitted by a first user, the first query relating to a first set of database records;
  detecting, by a computer, whether a second query for a second set of database records which is submitted by a second user, the second set of database records associating with the first set of database records, wherein the second user is associated with a level of an organization;
  examining, after detecting the second query for the second set of database records is submitted by the second user, an employee number associated with the second set of database records submitted in the second query and an employee number associated with the second user to determine if the second user is authorized to access the second set of database records;
  denying the second user from accessing the second set of database records if the employee number associating with the second set of database records submitted in the second query matches the employee number associated with the second user;
  determining, if the employee number associating with the second set of database records submitted in the second query differs from the employee number associated with the second user, whether the lock is acquired by the first user, and whether the second user is authorized to acquire the lock for the second set of database records based on the employee number of the second user and, when the employee number associated with the second set of database records matches an identifier of the second user, whether the second set of database records comprise critical or non-critical information;
  denying the lock to the second user if the lock is acquired by the first user;
  granting the lock to the second user if the lock is not acquired by the first user; and
  informing, after denying to grant the lock to the second user, the second user with information relating to the identification of the first user, in accordance with the level of the second user.

25. The method of claim 24, wherein the second user is not authorized when the second set of database records comprise critical information.

26. The method of claim 25, wherein the critical information comprises pay records of the second user.

27. A method for authorizing access to a human resources database, comprising:
  acquiring a lock after a first query is submitted by a first user, the first query relating to a first set of database records;
  detecting, by a computer, whether a second query for a second set of database records is submitted by a second user, the second set of database records associating with the first set of database records, wherein the second user is associated with a level of an organization;
  examining, after detecting the second query for the second set of database records which is submitted by the second user, an employee number associated with the second set of database records submitted in the second query and an employee number associated with the second user to determine if the second user is authorized to access the second set of database records;
  denying the second user from accessing the second set of database records if the employee number associating with the second set of database records submitted in the second query matches the employee number associated with the second user;
  determining, if the employee number associating with the second set of database records submitted in the second query differs from the employee number associated with the second user, whether the lock is acquired by the first user, and whether the second user is authorized to access the second set of database records on the second set of database records, the second user being authorized if the second user does not have a conflict of interest with respect to the second set of database records, wherein the second user does not have a conflict of interest when the employee number associated with the second set of database records does not match the employee number associated with the second user;
  denying the lock to the second user if the lock is acquired by the first user;
  granting the lock to the second user if the lock is not acquired by the first user; and
  informing, after denying to grant the lock to the second user, the second user with information relating to the identification of the first user, in accordance with the level of the second user.

28. A method for authorizing access to a human resources database, comprising:
  acquiring a lock after a first query is submitted by a first user, the first query relating to a first set of database records;
  detecting, by a computer, whether a second query for a second set of database records is submitted by a second user, the second set of database records associating with the first set of database records, wherein the second user is associated with a level of an organization;
  examining, after detecting the second query for the second set of database records is submitted by the second user, an employee number associated with the second set of database records submitted in the new second query and an employee number associated with the second user to determine if the second user is authorized to access the second set of database records;
  denying the second user from accessing the second set of database records if the employee number associating with the second set of database records submitted in the second query matches the employee number associated with the second user;
  determining, if the employee number associating with the second set of database records submitted in the second query differs from the employee number associated with the second user, whether the lock is acquired by the first user, whether the second user that submitted the query is authorized to access the second set of database records, wherein the second user is authorized if the second user does not have a conflict of interest when the second set of database records do not personally pertain to the second user;
  denying the lock if the second user is not authorized;
  granting the lock to the second user if the lock is not acquired by the first user; and
  informing, after denying to grant the lock to the second user, the second user with information relating to the identification of the first user, in accordance with the level of the second user.

* * * * *